May 15, 1928.
G. D. JONES
VACUUM LAWN MOWER
Filed Aug. 3, 1926
1,669,471
2 Sheets-Sheet 1
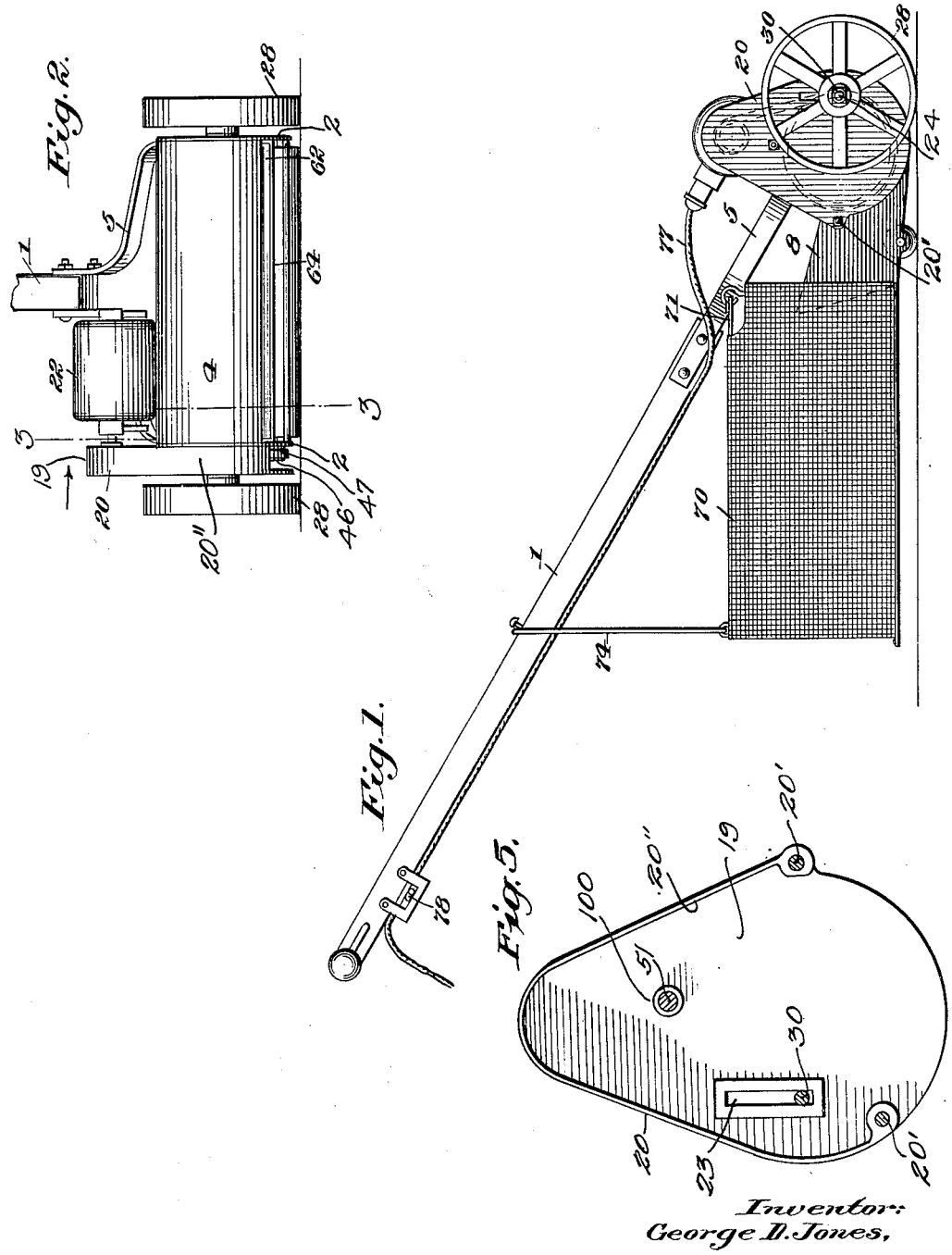
Inventor:
George D. Jones,
by C. A. Mason, Att'y.

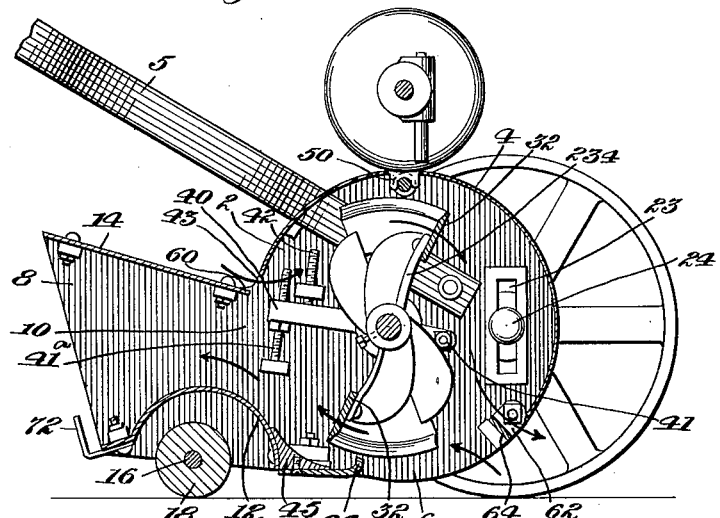
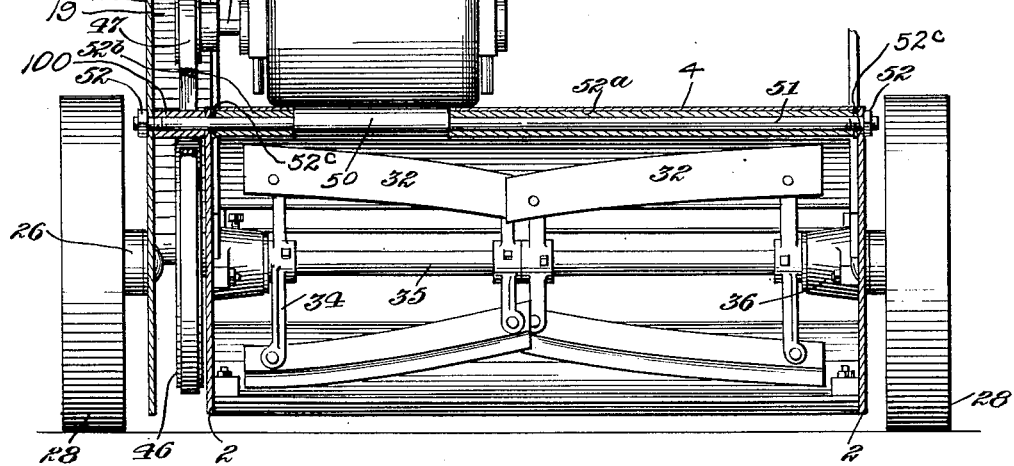

Patented May 15, 1928.

1,669,471

UNITED STATES PATENT OFFICE.

GEORGE DOUGLAS JONES, OF SACRAMENTO, CALIFORNIA, ASSIGNOR TO ELECTRIC VACUUM LAWN MOWER COMPANY, OF STOCKTON, CALIFORNIA, A CORPORATION OF CALIFORNIA.

VACUUM LAWN MOWER.

Application filed August 3, 1926. Serial No. 126,880.

This invention relates to lawn mowers and more particularly to lawn mowers which are power driven as to the cutting elements thereof, this application being a continuation in part of my application Serial No. 686,081, filed January 14, 1924.

Lawn mowers are of two recognized types, namely, those in which power is applied manually both for propelling the lawn mower over the lawn and for operating the cutting blades, and those in which power both for propelling the mower and for operating the cutters is derived from a motor, such as an electric motor. In the illustrated embodiment of the present invention the cutters are driven by power derived from a motor, so that while the operator has to apply sufficient manual power to propel the machine over the ground, the cutting operation is performed entirely without effort on his part. It will be understood, however, that certain features of the invention are capable of use with other types of lawn mower than that in which the cutter, only, is power driven.

A very important feature of the present invention resides in the construction of the cutting blades whereby they perform both the functions of a cutter and a fan blower. In order that they may efficiently perform the latter function the blades are so shaped, and a casing surrounding the blades is so designed as to its inlet and outlet passages, that the grass, when cut, together with all leaves, paper, trash and the like coming within the zone of action of the machine, will be taken up and discharged into a suitable receptacle. The performance of this function by the present apparatus is so complete and thorough that none of the cuttings, trash, paper or other débris is permitted to pass the discharge opening and thereby enter the upper part of the casing so as to interfere with the free operation of the rotary cutter blades.

The rotary cutting blades are surrounded by a casing which is provided at its lower side with an opening where the grass is cut, and said casing is provided to the rear of said opening with a discharge opening leading to a passageway in communication with a suitable waste receptacle. Immediately above the discharge opening the casing is provided with an aperture for the admission of air to break the partial vacuum caused by the rapid rotation of the cutters, thus setting up a counter-current of air, and this air current finds its outlet through an opening which is located in the front portion of the casing. This construction effectually prevents any of the grass, trash, leaves, etc. from entering the casing above the discharge opening and thus interfering with the free action of the cutter.

Another feature of the invention of importance is found in the application of a baffle plate at a point immediately adjacent the aforesaid air outlet. This baffle plate serves to deflect the outgoing air current at the forward part of the casing, away from the opening in the bottom portion of the casing so that said air current will not act to depress the standing grass and thus interfere with the cutting operation.

A most advantageous result following from the use of my invention is found in the prevention of the scattering and dissemination of the grass cuttings over a lawn, which results often in decomposition of the dead grass and a consequent interference with the growth of the living grass as the cuttings form a thick mat sometimes about the roots which can only be removed by the use of a rake. The employment of rakes for the purpose of removing the dead grass cuttings causes injury to the roots of the grass, and should be avoided if possible. By the use of the present invention the grass cuttings, as well as other foreign matter, is all cleaned up and removed without injury to or interference with the free operation of the cutting blades so that when the lawn cutting operation is completed there will be no necessity to resort to the further operation of cleaning the lawn.

I am aware that efforts have been made to remove the grass cuttings during the progress of the mowing operation, in some instances by the use of independently operating suction blowers, and in others by receptacles which are mounted to the rear of the cutter, for the purpose of having the cuttings discharged therein. Such devices either involve complicated and additional mechanism, or, where an independent blower is not employed only a portion of the cut grass will be discharged into the receptacle as a certain amount of said grass is always scattered about the lawn. By my invention, however, I have found that the cut grass is entirely removed from the lawn as the cutting progresses, and that all of said grass is deposited in a receptacle which may be connected to the discharge passage leading from the casing enclosing the cutter blades.

The foregoing, and other features of the invention, such as important details of construction and combinations of elements will be better understood from the following description, and will be more particularly pointed out in the appended claims.

In the drawings,

Figure 1 illustrates, in side elevation, a lawn mower embodying the invention;

Figure 2 shows the lawn mower in front elevation;

Figure 3 is an enlarged longitudinal section view on the line 3—3 of Figure 2;

Figure 4 is a view from the front of the machine with parts of the casing in section to disclose the interior mechanism; and Figure 5 is a view in elevation showing the inside of the belt and pulley housing.

A casing comprising end walls 2, and a main body portion 4 which is curved so that its outline in general is in the form of a cylinder or drum, encloses the mechanism of the lawn mower. Said casing is provided with a lower inlet opening 6 at which point the grass is cut, and a discharge opening 10, and rearwardly thereof the sides are extended at 8, the said extensions of the side walls being increased vertically from the opening 10 to the rear extremity of said walls, the latter forming, with an upwardly curved bottom 12, and a cover or top 14, a flaring, rearwardly extending discharge passage for the grass, cuttings, weeds, trash, paper, etc.

The side walls 2 support the axle 16 of a roller 18 which sustains the rear portion of the machine.

The casing or drum has, at one side thereof, a housing 19 comprising a plate or wall 20 and a rim or flange 20″ extending about a portion of the plate which encloses a space to accommodate the driving and driven pulleys and the belt through which the cutting blades are rotated, the motor from which power is derived to effect such rotation being mounted in a casing 22, herein shown as supported at the top of the drum 4. The flange 20″ of the housing 19 is provided with apertured bosses to receive bolts 20′ which pass through holes in the adjacent end wall 2 of the casing, and are provided with nuts (see Figure 1) whereby the housing is clamped to said wall 2. Another hollow boss, 100, projects from the plate 20 and abuts against the adjacent end plate 2.

The plate 20 of the housing 19 and one of the side walls 2 of the casing each have vertical slots 23 which receive bolts 24. These bolts are surrounded by sleeves 26 forming bearings for the ground wheels 28 which support the forward part of the machine. The bolts 24 are threaded at their outer ends to receive nuts 30, and by loosening these, and sliding the bolts in the slots 23, the wheels 28 may be vertically adjusted relatively to the casing of the lawn mower for purposes which will be explained hereinafter.

The cutting elements of the lawn mower comprise the blades 32 which are mounted on spokes 34 rigidly secured to the shaft 35. This shaft is supported in suitable bearings 36 which are carried by two adjusting bars 40, which are supported at 41 upon pivots carried by the plates 2 of the casing. Suitable adjusting screws 41ª, 42 permit the bearings 36 to be swung in a substantially vertical plane from the pivotal points 41 as a center to thereby adjust and determine the distance of the edges of the cutter blades from a stationary cutter 44, which latter is secured to a bar 45 by screws, as shown, or other fastenings, rigid with the bottom wall 12 of the casing. The bar 45, is shown as being triangular in cross-section, and is suitably attached by screws or equivalent fastenings to the curved forward edge of the bottom 12.

The shaft 35 carries a suitable pulley 46 from which a belt 47 extends to a smaller pulley 48, the latter being mounted on the shaft 49 of an electric motor enclosed in the casing 22. The curved part 4 of the casing is provided with a suitable slot to receive a grooved lug 50 which projects from the lower part of the motor casing, and this lug straddles a tension rod 51 which extends through alined apertures in the upper part of end plates 2, 2, the left hand end of the rod (see Figure 4) extending beyond plate 2 at the left, and through the boss 100, and an aperture in plate 20 of the housing 19. The ends of the rod 51 are threaded and receive nuts 52 which bear against the outer faces of the housing plate 20, and end plate 2, respectively, and yieldable washers 52ᶜ are interposed between the outer ends of the tubes 52ª and 52ᵇ and the end plates 2, 2 of the casing. By tightening the nuts 52, pressure is applied through plate 20, boss 100 and end plates 2, 2, to the tubes 52ª and 52ᵇ, which are caused to frictionally engage and hold the lug 50, the clamping pressure being sufficient to cause such a slight distortion of the end plates 2 as to grip the lug tight enough to hold the motor in position. When it is desired to remove the motor one of the nuts 52 will be turned in a direction to relieve the clamping pressure on the sectional tubes and the motor may then be freely taken off of the lawn mower casing. To replace the motor, the lug 50 is inserted in the slot of the casing and over the rod 51, following which one of the nuts 52 will be tightened, thereby firmly clamping the tube sections 52ª, 52ᵇ against the lug 50 to hold the motor firmly in position.

The casing of the lawn mower is provided with a vent opening in the form of an elongated slot 43 which is located immediately above the forward edge 60 of the cover plate 14, which edge acts as a baffle plate. When the cutting blades are in operation a current of air is set up in the lower part of the casing, as indicated by the arrows therein, the direction of said current being from the lower opening 6, thence rearwardly and out of the opening 10 into the discharge passage. The grass and other heavy material which is thus discharged by this current of air is prevented from entering the casing above the edge 60 of the cover 12, being confined entirely to the exit opening 10, so that none of the grass, trash, etc. is permitted to follow the cutter blades in their rotation above the edge 60 so as to enter the upper part of the casing and interfere with the free action of the cutter. This desirable result is accomplished mainly by the aperture 43. The rotation of the cutter blades tends to cause a suction, or rarified air condition in the drum 4 which draws air through the aperture 43, and the entrance of air through the aperture 43 prevents the formation of a partial vacuum. This current of air passes through the upper portion of the casing 4 and is discharged through an opening 62 at the lower forward portion of the casing. The opening 62 is formed between a baffle plate 64 and the forward edge of the drum 4 and the plate extends across the casing. The outgoing current of air is thus deflected by said baffle plate so as to pass through the aperture 62 instead of passing out of the main inlet opening 6. Without said baffle plate the outgoing current of air would have a tendency to depress the blades of grass and thus interfere with the cutting operation.

The establishment of a counter-current of air between the inlet opening 43 and the air discharge opening 62 is a very important feature of my invention, as I have discovered that this current of air effectually prevents any of the cuttings, weeds, trash, or other substances which enter the opening 6 from being carried into the upper part of the casing. In other words, the suction which is created by the blades between the edge 60 and the baffle 64 will be broken by air entering the air vent 43, so that the upper portion of the casing will not be under a relatively low air pressure. Entrance of the heavier particles into the casing above the edge 60 is accordingly prevented. By reason of the fact that the cutter blades 32 act as a suction fan or blower, I am enabled with the construction above described to pick up all of the grass cuttings, together with any other loose material over which the opening 6 in the casing passes as the lawn mower is operated, and to discharge all of this material through the opening 10 and into a receptacle.

Referring to Figure 1, a receptacle 70, which may be composed of a suitable frame as 71, and a canvas or other textile covering, is attached by the hooks 72 (Figure 3) and a rod 74 to the handle-bar 1 of the lawn mower. The handle-bar is secured by the usual angular brackets 5 to the mower casing. Suitable electric conductors 77 which may be supported upon the bar 1, feed current to the motor in the casing 22, the supply of current being conveniently controlled by a switch, at 78, on the bar 1.

The cutter blades are especially designed, both as to shape and width, to perform the function of a suction fan or blower, in addition to their usual cutting function. As herein shown, said blades are mounted in two sets on the shaft 35, one of said sets of blades being "staggered" relatively to the other set, although this particular arrangement is not necessary to the performance of the functions of the blades as contemplated by the present invention.

Inasmuch as the only manual power required in the operation of this lawn mower is that which is necessary to propel the same over a lawn, the speed of rotation of the cutters may be as high as desired in order to perform the best results, and this speed is controllable by the usual electrical means, such as a rheostat.

The adjustment of the casing with relation to the wheels 28, by means of the slots 23, bolts 24 and nuts 30 permits the location of the inlet opening 6 at a desired distance above the surface of the lawn, such distance being determinable by experimental adjustment of the parts, in order that the most perfect results may be secured, both as to the length of the cuttings and the amount of air which enters with the cuttings and is discharged through the opening 10. I regard this as an important feature of the present invention, and especially with reference to the discharging function which is performed through the blower action of the cutting blades.

The right is reserved to make such changes in the details of construction or arrangement of the parts herein shown as will fall within the scope of the following claims.

Having thus described my invention what I claim as new and what I desire to secure by Letters Patent of the United States is:

1. In a lawn mower, the combination of a rotary cutter having cutting blades extending transversely of the mower, with a casing enclosing said blades and provided with a lower entrance opening and a rear discharge for the cuttings, and a vent opening into the upper part of the casing, an air outlet opening at the front of the casing and a baffle plate beyond said outlet opening for preventing the accumulation of grass cuttings in the upper part of the casing above the discharge for the cuttings.

2. In a lawn mower, the combination of a rotary cutter having cutting blades extending transversely of the mower, an inlet opening in said casing, a rear discharge opening leading to a passage to receive the grass cuttings, a baffle plate to arrest the movement of the cuttings above said passage, and an air vent opening immediately above said baffle plate.

3. In a lawn mower, the combination of a rotary cutter, having cutting blades, a casing enclosing said cutter and provided with an inlet opening at the lower portion thereof, a stationary cutting blade at the rear of said opening, a discharge opening back of said cutting blade leading to a passage, a baffle above said passage, a vent opening into the casing above said baffle, an outlet opening at the front of the casing for the air which enters said vent opening and a baffle plate beyond said outlet opening.

4. A lawn mower having, in combination, a rotary cutter including cutting blades, a casing enclosing said cutter having an inlet at its lower portion, a discharge opening at the rear thereof and a passage leading from said discharge opening, a vent opening for the casing above said discharge opening, an outlet at the lower front portion of the casing for the air entering said vent opening, and a baffle plate between said air outlet and said inlet.

5. A lawn mower having, in combination, a casing provided with an inlet at its lower portion, a rear discharge opening, an air inlet above said discharge opening, an air outlet at the forward part of the casing, a baffle separating said air outlet from the lower inlet opening, and a cutter comprising a shaft, rotary cutting blades mounted upon said shaft, and means to rotate said cutter independent of the power for propelling said lawn mower.

6. In a lawn mower, the combination of a rotary cutter having blades, a casing enclosing said cutter and provided with an inlet opening, a rearward discharge opening, a baffle plate above said discharge opening, a vent opening in the casing above said baffle plate, a discharge outlet for the air at the forward portion of the casing, a baffle plate beyond said outlet supporting wheels for said casing, and means to adjust said wheels relatively to the casing so as to locate said inlet opening at different distances from the ground.

7. A lawn mower having, in combination, a rotary cutter having cutting blades extending transversely of the mower, a casing surrounding said cutter and provided with an inlet, a rearward discharge opening for the cuttings, a passageway leading from said discharge opening and designed to conduct the cuttings to a suitable receptacle, means for venting said casing immediately above said discharge passage, an air outlet at the forward part of the casing, supporting wheels for the casing, a baffle plate beyond said outlet and means to adjust the casing relatively to said wheels so that the inlet opening may be located at the desired distance from the surface of the lawn.

8. A lawn mower having, in combination, a casing provided with a slot, a rotary cutter mounted in said casing, a motor for driving said cutter having a forked lug projecting therefrom and arranged to enter said slot, a rod passing transversely through the casing and arranged to engage between the forks of said lug, sectional tubes mounted upon said rod and arranged with the sections abutting the opposite ends of said lug, and means for clamping the tube sections against said lug.

In testimony whereof I have hereunto set my hand this 16th day of July A. D. 1926.

GEORGE DOUGLAS JONES.